United States Patent

[11] 3,615,973

[72] Inventor Ernest P. Meeder
c/o J. W. Johnson Co. 3100 W. Randolph, Bellwood, Ill. 60104
[21] Appl. No. 733,910
[22] Filed June 3, 1968
[45] Patented Oct. 26, 1971

[54] METHOD AND APPARATUS OF PRODUCING POLYURETHANE RESIN ON A SUBSTRATE
8 Claims, 1 Drawing Fig.

[52] U.S. Cl..................................................... 156/79, 156/231, 156/324, 156/373
[51] Int. Cl..................................................... B32b 5/18
[50] Field of Search........................................... 156/78, 79, 231, 324, 373

[56] References Cited
UNITED STATES PATENTS

| | | | | |
|---|---|---|---|---|
| 1,612,714 | 12/1926 | Geyer | | 156/231 X |
| 2,797,729 | 7/1957 | Runton | | 156/79 |
| 2,850,467 | 9/1958 | Livingood | | 156/79 X |
| 3,163,689 | 12/1964 | Ives | | 156/231 X |
| 3,236,712 | 2/1966 | Mason | | 156/231 |
| 3,307,993 | 3/1967 | Gottwald et al. | | 156/324 X |
| 3,316,137 | 4/1967 | Wisotzky | | 156/324 X |

Primary Examiner—Benjamin R. Padgett
Assistant Examiner—S. R. Hellman
Attorney—Hofgren, Wegner, Allen, Stellman and McCord ABSTRACT: A method and apparatus of producing polyurethane resin on a substrate in a continuous manner in which the flowable at least partially unreacted resin is deposited in a thin stream in a back-and-forth movement between the substrate and a pressure web operating in conjunction with a rotating heated drum to set the resin to a solid after which the set resin and substrate in the form of a flexible sheet are removed from the heated drum. The resin may be either foamed or unfoamed and the substrate may be either permanently attached to the resin or may be stripable therefrom.

PATENTED OCT 26 1971　　　　　　　　　　3,615,973
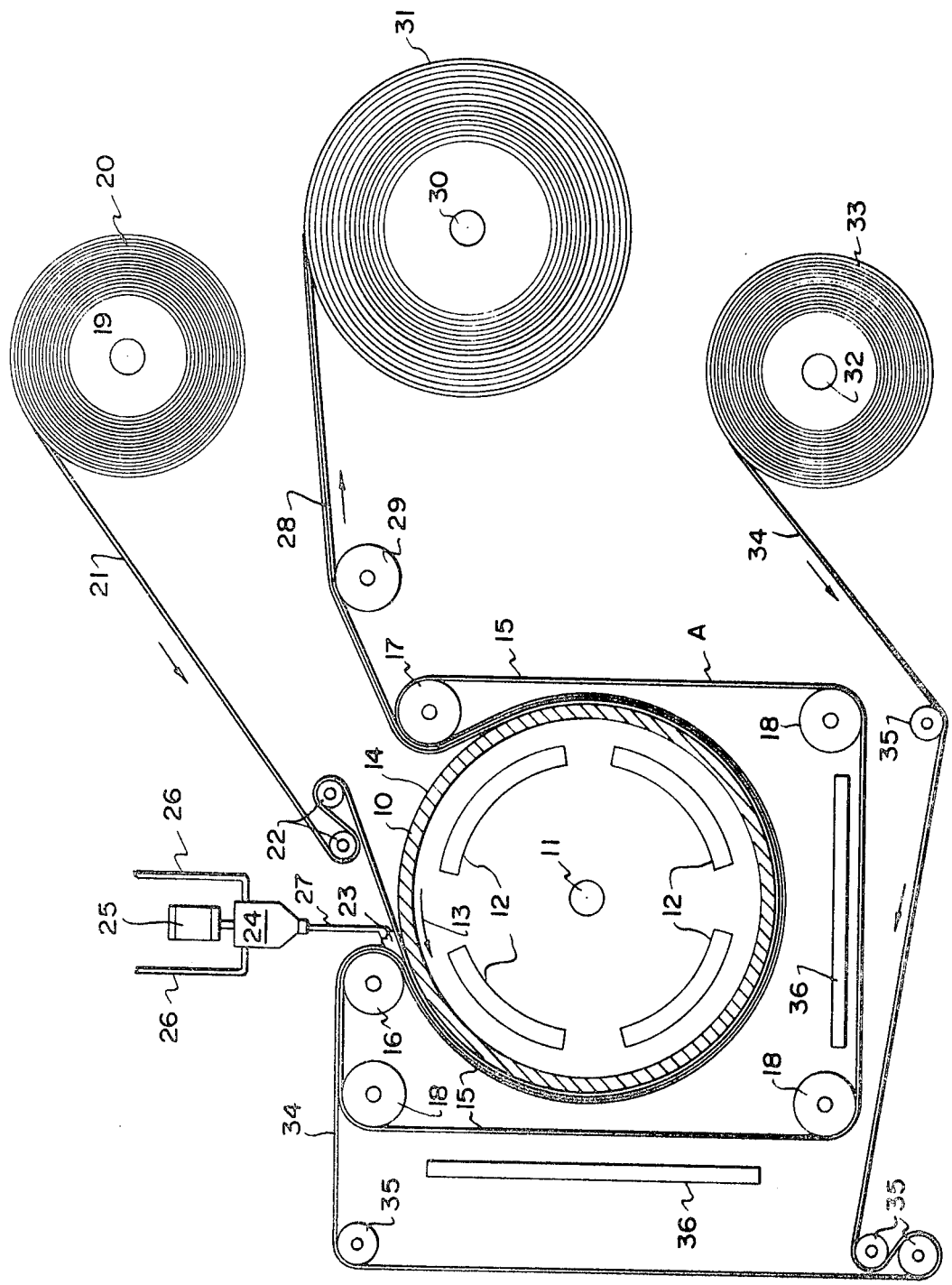
INVENTOR
ERNEST P. MEEDER
BY Hofgren, Wegner, Allen, Stellman & McCord.
ATTORNEYS.

METHOD AND APPARATUS OF PRODUCING POLYURETHANE RESIN ON A SUBSTRATE

The method and apparatus of this invention is capable of making a wide variety of products as will be explained in detail hereinafter in which the heat set resin is either permanently or temporarily attached to the substrate sheet. The set polyurethane resin is produced continuously and uniformly as desired.

One embodiment of the method and apparatus of the invention is illustrated in the accompanying drawing which is a semidiagrammatic illustration of the apparatus of the invention used in practicing the method of the invention.

As stated, the resin is a polyurethane resin. The manner in which the urethane is prepared forms no part of the present invention. Thus, the urethane may be prepared in any manner desired and it may be either a polyester or polyether type formed by reaction with a polyisocyanate. These methods of making urethanes are well known and widely described in patents as well as other scientific literature. The preparation of products from free isocyanate radical-containing polyurethane products resulting from the reaction between (1) an alkyd or other active hydrogen-containing organic polymeric material and (2) organic compounds containing, as the sole reacting groups, a plurality of isocyanate groups, is described in "German Plastics Practice" by De Bell et al., 1946, pp. 315 and 463–465. Other disclosures of reactants and methods which may be employed to produce polyurethanes applicable to this invention are U.S. Pat. Nos. 2,282,827; 2,284,637; 2,284,896; 2,292,443; 2,333,639; 2,358,475; 2,779,689; 2,787,601; 2,788,335; 2,850,464; 2,833,730; 2,842,506 and 2,814,600.

One general method of making the urethane is by reacting a polyisocyanate with a compound containing an active hydrogen group such as a polyether or a polyester to produce a prepolymer. The prepolymer is then foamed by reaction with water if a foam product is desired and preferably an amine catalyst to produce carbon dioxide as a byproduct which forms bubbles and results in the foams. The urethane foam may also be produced by the so-called one-shot process wherein the polyisocyanate, the active hydrogen containing compound and the foamer such as water and, preferably, a catalyst and a silicone fluid are all included in the reaction at the same time. These reactions are well known to those skilled in the art and have been the subject of much study by many researchers and research groups since 1945. As is well known, the urethanes may be produced without a foam formation, if desired, and the resulting urethane may be calendered and formed much as rubber is calendered and formed.

EXAMPLE 1

A prepolymer resin was prepared by the following procedure: 444.8 lbs. of Pluronic L-61, hydroxyl number 50.5, was premixed with 63.5 lbs. of PPG-400, hydroxyl number 288.8, representing a hydroxy equivalent ratio of 0.4448 to 0.3635. This polyol mixture should have hydroxyl number of 80–81 and the acid number was adjusted to 0.03 and water content to 0.39 percent. To this mixture 235 lbs. of toluene diisocyanate, 0.002 to 0.003 percent total acidity, were added while mixing. The NCO/OH ratio was about 3.44. After 30 minutes the heat of reaction caused the temperature to rise to about 130° F. With additional heating requiring 2 hours, the mixture reached a temperature of 212° F. The reaction was allowed to proceed at 212° F. until the viscosity was about 3900–4200 centistokes. The resulting prepolymer was cooled to 100–125° F.; it contained about 9.35 percent free NCO. The total process took about 8½ to 9½ hours.

For each 100 parts by weight of the above prepolymer, previously adjusted to 9.8 percent free NCO, the following were added: 0.2 part of silicone fluid DC-200 (polydimethylsiloxane) at 25° C., 50 centistokes viscosity, 17 parts Titanox RCHT-X and 0.167 part Benzedine Yellow No. 12220 dye.

A catalyst solution was made as follows: 15 parts water, 1.5 parts triethyl amine and 5 parts diethylethanolamine.

The urethane was prepared as follows:

Precision metering pumps were used to pump out the prepolymer resin/catalyst solution in the ratio of 32-25:1 to a mixing head having a capacity of 100 ml. A triple blade turbine mixer was employed using a mixing speed of 3400 r.p.m. To facilitate the resin pumping, the resin was heated up to 120° F. The rate of pumping was 5 lbs. per minute (ca.).

The Pluronic L-61 has the formula

$HO(C_2H_4O)_a(C_3H_6O)_b(C_2H_4O)_cH$

It has a molecular weight of the polyoxypropylene base of about 1501–1800 and an oxyethylene content of about 10 percent. The PPG-400 is polypropyleneglycol with a molecular weight of about 400. The Titanox RCHT-X consists of calcium sulfate particles coated with titanium dioxide.

In the illustrated apparatus there is provided a rotatable drum 10 that is rotatable about a central axis 11 by customary means and the drum is hollow and contains internal heating elements 12 located adjacent the inner surface of the drum. During use the drum is rotated about the axis 11 as illustrated by the arrow 13.

Arranged about a major portion of the outer circumference of the drum 10 (preferably for greater than 270° around this peripheral surface 14) is an endless pressure web or belt 15 that is guided to the surface 14 by a roller 16 and away from this surface by a roller 17. In the illustrated embodiment the web 15 is adjacent the surface 14 for about 300°. The web 15 is then directed back to the roller 16 by a pair of rollers 18 spaced from the drum 10.

In order to feed the substrate around the drum 10 there is provided a reel 19 for supporting a roll of the substrate. In one use of this invention the substrate was a roll of fabric 20 from which the fabric sheet 21 was directed over a pair of spaced idler rolls 22 and onto the surface 14 of the drum beneath the web 15 and between the drum 10 and the roller 16. The drum 10 is rotated and the substrate sheet 21 is moved at about the same linear speed so that there will be substantially no slippage between the drum and the sheet. This is also true of the web 15. With this arrangement the sheet 21 and the pressure 15 approach the surface 14 of the drum 10 at different angles so as to provide a bite 23 therebetween. In the embodiment shown above this bite is a laterally movable mixer comprising a mixing chamber 24 powdered by an electric motor 25 and supplied with liquid ingredients for forming the polyurethane resin through a plurality of flow lines 26. Thus in the above example 1 of the polymer, the output from the metering pumps (not shown) flowed through the lines 26 of which only two are shown here and into the mixer 24.

From the mixer 24 the mixed resin material was delivered through a nozzle 27 in a thin stream to the bite 23 with this stream preferably having an average cross-sectional dimension (or diameter where the stream is of circular cross section) of about ⅛ to ⅜ inch.

During this time the fabric sheet 21, the drum 10 and the pressure web 15 are, as explained above, traveling at substantially the same linear speed. During the depositing of the reactant mixture from the nozzle 27 as described, the nozzle is passed back and forth the length of the drum 10 so that the resin mixture is deposited in a back and forth bead at such a rate that a desired supply of the mixture is provided at the bite 23. This means, of course, that the greater the length of the heated drum 10 the higher the speed of back and forth movement of the nozzle 27 that must be provided. In one embodiment of the invention the drum 10 was about 60 inches long and the diameter of the bead deposited at the bite 23 was about ¼ of an inch. Under these conditions the rotation of the drum 10 and the speed of back and forth movement of the nozzle 27 were correlated so as to deposit the desired amount of resin at the bite. Obviously, these correlated conditions will vary for each different product because the nature of the product to be produced will determine the thickness of the resin deposit on the sheet 21.

The roller 16 is of course a gauge roller and is adjustable by means not shown toward and away from the peripheral surface 14 to produce a resin deposit of the desired thickness. The resin of example 1 is foamable so that a foamed polyurethane is produced on the sheet 21 in this first embodiment. However, as explained earlier, the resin may be produced without a foam formation if desired.

During the above procedure the drum 10 was rotated as indicated by the arrow 13 so that as the sheet 21 and pressure web 15 moved around the drum in a counterclockwise direction, as illustrated, the temperature and dwell time on the drum were such that the liquid resin mixture was completely set to a solid by the time the assembly reached the first roller 17. From here the foamed urethane coated sheet 28 was directed over an idler roller 29 to a takeup reel 30 on which it was arranged in the form of a roll 31 of the coated fabric.

In certain instances it may be desired to deposit the urethane between a pair of flexible substrates. The apparatus therefore includes another reel 32 from which another flexible substrate may be drawn. As illustrated in the drawing, this flexible substrate may be a second roll 33 of fabric 34 which may be directed from the reel 33 over a series of idler rolls 35 onto the traveling pressure web 15. This fabric 34 then defines the other side of the bite 23 so that the urethane foam from the nozzle 27 is deposited between the fabric sheets 21 and 34. In this operation of the apparatus the assembly of the urethane with the fabric on opposite sides thereof is rolled onto the takeup reel 30.

The apparatus of this invention may also be used to make a variety of other types of products. One such product is the production of a polyurethane film that is adhesive. When the apparatus is used in this manner the liquid adhesive (not shown) is applied to the outer surface of the pressure web 15 at some point such as point A considerably prior to the area where the polyurethane mixture is applied at the bite 23. In order to aid in removing the adhesive from the web 15 it is preferred that in this use the web have a nonadherent surface such as by providing it with a silicone resin coated outer surface. As the web travels in the direction indicated in the accompanying drawings the adhesive either air dries or may be dried by adjacent heating elements 36 which like the elements 12 may be electric heating elements. Then when the urethane mixture from the nozzle 27 is directed into the bite 23, as previously described, the adhesive on the web 15 will be transferred to the solid urethane with the result that the sheet leaving the drum 10 and the pressure web 15 at the roller 17 will comprise a fabric coated with solid polyurethane which is in turn coated with the adhesive.

If desired, the same product may be produced but instead of having a sheet substrate attached to the urethane the sheet may be a release sheet such as release paper so that the product that is taken up on the takeup reel 30 would then be a sheet of urethane containing adhesive therein.

In another use of the apparatus of this invention the substrate sheet fed from the supply reel 19 may itself be coated with a releasable adhesive so that the urethane sheet leaving the drum 10 at the roll 17, as previously described, would then contain adhesive on both sides, the adhesive on one side being supplied as stated above from the surface of the pressure web 15 and the adhesive for the other side being supplied by that deposited on the release paper from the supply reel 19.

The apparatus and method may also be used to produce an embossed sheet by supplying the substrate from the reel 19 in the form of an embossed release paper while the sheet from the reel 32 may be plain release paper.

If desired, urethane coated substrates such as flexible fabrics may be produced with the urethane in the form of shaped deposits on the substrate. In these instances, the surface 14 of the drum 10 may be designed as by milling grooves therein to deposit the urethane on the substrate in the form of cleats, for example.

As can be seen from the above description, the apparatus with the basic elements shown and described herein may be used to produce a wide variety of products comprising polyurethane rapidly, economically and efficiently.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. The method of producing polyurethane resin on a substrate, comprising: providing a rotatable heated drum; directing a moving pressure web onto the peripheral surface of said drum and then around a major portion of said peripheral surface, the drum rotating and the web moving at substantially the same linear speeds; directing a flexible sheet onto said rotating drum and then around the drum between said web and drum, thereby providing a bite between the web and sheet at substantially the area where they both approach the drum; flowing an at most partially reacted liquid polyurethane mixture onto said sheet in a thin stream back and forth along said bite while said drum and web are rotating and moving, and removing said sheet and solid polyurethane thereon from said drum and pressure web, the dwell time of said urethane on the drum and the temperature of the drum alone being sufficient to set the liquid polyurethane to a solid while the urethane is on the drum.

2. The method of claim 1 wherein said thin stream of polyurethane mixture has an average cross-sectional dimension of ⅛ to ⅜ inch.

3. The method of claim 1 wherein a pair of flexible sheets are directed onto said rotating drum to provide said bite between the pair of sheets and said polyurethane mixture is flowed between said sheets at said bite, the pair of sheets and the said polyurethane therebetween being removed from between the drum and the pressure web as a unit.

4. The method of claim 1 wherein said sheet is a release sheet which is then stripped from the resulting urethane film after said removal of the sheet and polyurethane from the drum.

5. The method of claim 1 in which a pressure sensitive adhesive is applied to said web ahead of said bite for transfer to the polyurethane.

6. The method of claim 5 wherein said sheet is a release sheet which is then stripped from the resulting urethane film after said removal of the sheet and polyurethane from the drum.

7. Apparatus for producing polyurethane adhered to a substrate, comprising: a rotatable heated drum; an endless pressure web adjacent a major portion of the peripheral surface of said drum and movable therewith, the web approaching said surface at an angled bite; means for directing a flexible sheet onto said rotating drum at said bite between said drum and web; means for directing a flowable polyurethane to the bite between said sheet and pressure web from a nozzle traversing back and forth the length of said bite and thus of said drum while said drum is rotating with said moving web to apply said polyurethane to said sheet, the dwell time of said urethane on the drum and the temperature of the drum alone being sufficient to set the liquid polyurethane to a solid while the urethane is on the drum; and means for removing said sheet and applied solid polyurethane coating from between said drum and pressure web.

8. The apparatus of claim 7 wherein said nozzle has an outlet opening of about ⅛ to ⅜ inch diameter.

* * * * *